United States Patent
Strangman et al.

(10) Patent No.: US 6,482,537 B1
(45) Date of Patent: Nov. 19, 2002

(54) LOWER CONDUCTIVITY BARRIER COATING

(75) Inventors: Thomas E. Strangman, Phoenix, AZ (US); Derek Raybould, Denville, NJ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 09/535,394

(22) Filed: Mar. 24, 2000

(51) Int. Cl.[7] .............................. B32B 5/14; B32B 15/04
(52) U.S. Cl. .................... 428/633; 416/241 B; 428/610; 428/613; 428/623; 428/627; 428/632
(58) Field of Search ................................. 428/469, 472, 428/701, 702; 128/633, 632, 627, 623, 613, 610; 416/241 B

(56) References Cited

U.S. PATENT DOCUMENTS

| | | |
|---|---|---|
| 2,927,043 A | 3/1960 | Stetson et al. |
| 3,410,716 A | 11/1968 | Hiltz |
| 3,415,672 A | 12/1968 | Levinstein et al. |
| 3,489,537 A | 1/1970 | Cook |
| 3,849,865 A | 11/1974 | Gedwill et al. |
| 3,869,779 A | 3/1975 | Gedwill et al. |
| 3,955,935 A | 5/1976 | Shockley et al. |
| 3,978,251 A | 8/1976 | Stetson et al. |
| 3,979,534 A | 9/1976 | Rairden, III |
| 3,996,021 A | 12/1976 | Chang et al. |
| 4,005,989 A | 2/1977 | Preston |
| 4,080,486 A | 3/1978 | Walker et al. |
| 4,269,903 A | 5/1981 | Clingman et al. |
| 4,321,310 A | 3/1982 | Ulion et al. |
| 4,321,311 A | 3/1982 | Strangman |
| 4,335,190 A | 6/1982 | Bill et al. |
| 4,374,183 A | 2/1983 | Deadmore et al. |
| 4,399,199 A | 8/1983 | McGill et al. |
| 4,401,697 A | 8/1983 | Strangman |
| 4,405,659 A | 9/1983 | Strangman |
| 4,405,660 A | 9/1983 | Ulion et al. |
| 4,414,249 A | 11/1983 | Ulion et al. |
| 4,447,503 A | 5/1984 | Dardi et al. |
| 4,588,607 A * | 5/1986 | Matarese et al. ............ 415/423 |
| 4,639,399 A | 1/1987 | Aprigliano |
| 4,676,994 A | 6/1987 | Demaray |
| 4,880,614 A | 11/1989 | Strangman et al. |
| 4,916,022 A | 4/1990 | Solfest et al. |
| 5,015,502 A | 5/1991 | Strangman et al. |
| 5,080,977 A * | 1/1992 | Zaplatynsky ................ 428/469 |
| 5,238,752 A | 8/1993 | Duderstadt et al. |
| 5,512,382 A | 4/1996 | Strangman |
| 5,514,482 A | 5/1996 | Strangman |
| 5,683,761 A * | 11/1997 | Bruce et al. ................ 428/610 |
| 5,683,825 A * | 11/1997 | Bruce et al. ................ 428/701 |
| 5,906,895 A * | 5/1999 | Hamada et al. ............ 428/610 |
| 5,955,182 A * | 9/1999 | Yasuda et al. ............. 428/472 |

* cited by examiner

Primary Examiner—Archene Turner
(74) Attorney, Agent, or Firm—Robert Desmond, Esq.

(57) ABSTRACT

A thermal barrier coating for superalloy articles such as turbine engine vanes and blades that are exposed to high temperature gas is disclosed. The coating includes a columnar grained ceramic layer applied to an aluminide or MCrAlY bond coat by electron beam physical vapor deposition. The ceramic layer is comprised a plurality of layers of zirconia stabilized with 20 percent yttria and the interfaces between the layers are decorated with particles selected from a group consisting of $Ta_2O_5$ and alumina. Though not essential to the invention a layer of tetragonal zirconia may be deposited both under and over the ceramic coat. An improved electron physical beam vapor deposition process for applying this ceramic layer is also disclosed.

26 Claims, 2 Drawing Sheets

LOWER CONDUCTIVITY BARRIER COATING

TECHNICAL FIELD

This invention relates generally to thermal barrier coatings for superalloy substrates and in particular to a multilayer, ceramic thermal barrier coating having low thermal conductivity for superalloy blades and vanes in gas turbine engines.

BACKGROUND OF THE INVENTION

As gas turbine engine technology advances and engines are required to be more efficient, gas temperatures within the engines continue to rise. However, the ability to operate at these increasing temperatures is limited by the ability of the superalloy turbine blades and vanes to maintain their mechanical strength when exposed to the heat, oxidation, and corrosive effects of the impinging gas. One approach to this problem has been to apply a protective thermal barrier coating which insulates the blades and vanes and inhibits oxidation and hot gas corrosion.

Typically, thermal barrier coatings are applied to a superalloy substrate and include a bond coat and a ceramic top layer. The ceramic top layer is applied either by the process of plasma spraying or by the process of electron beam physical vapor deposition (EB-PVD). Use of the EB-PVD process results in the outer ceramic layer having a columnar grained microstructure. Gaps between the individual columns allow the columnar grains to expand and contract without developing stresses that could cause spalling. Strangman, U.S. Pat. Nos. 4,321,311, 4,401,697, and 4,405,659 disclose thermal barrier coatings for superalloy substrates that contain a MCrAlY layer, an alumina layer, and an outer columnar grained ceramic layer. A more cost effective system is disclosed in Strangman U.S. Pat. No. 5,514,482 which teaches a thermal barrier coating for a superalloy substrate that contains an aluminide layer, an alumina layer, and an outer columnar grained ceramic layer.

The ceramic layer is commonly zirconia stabilized with yttria. The prior art teaches that the amount of yttria can range from 6 percent to 35 percent of the layer. (see U.S. Pat. Nos. 5,238,752 and 4,321,310). It is also known in the prior art that cubic zirconia, which is zirconia stabilized with 20 percent yttria, has a significantly lower thermal conductivity relative to tetragonal zirconia which is stabilized with 6 to 8 percent yttria. However, despite the disadvantage of higher thermal conductivity most commercially available thermal barrier coatings use tetragonal zirconia stabilized with 7 percent yttria for the ceramic layer because it is more reliable due to its superior capability to resist spalling and particulate erosion.

Accordingly, there is a need for a thermal barrier coating having a ceramic layer that has thermal conductivity less than or equal to that of cubic zirconia and resistance to spalling of tetragonal zirconia as well as a need for a method to make such a coating.

SUMMARY OF THE INVENTION

An object of the present invention is to provide a superalloy article having a ceramic layer that has thermal conductivity less than or equal to that of cubic zirconia and resistance to spalling of tetragonal zirconia.

Another object of the present invention is to provide a thermal barrier coating system having a ceramic layer that has thermal conductivity less than or equal to that of cubic zirconia and resistance to spalling of the tetragonal zirconia.

Yet another object of the present invention is to provide an improved electron beam-physical vapor deposition process for making such ceramic layers.

Yet still another object of the present invention is to provide a chamber for use in such improved electron beam-physical vapor deposition process.

The present invention achieves these objects by providing a thermal barrier coating that includes an aluminide or MCrAlY bond coat and a columnar ceramic layer applied to the bond coat by electron beam-physical vapor deposition. The ceramic coat is comprised of a plurality of layers of cubic zirconia stabilized with 20 percent yttria with the interfaces between layers decorated with particles selected from a group of second phase metal oxides such as $Ta_2O_5$ and alumina. The preferred concentration of $Ta_2O_5$ and/or alumina particles within the yttria stabilized zirconia is 1 to 4 weight %. An alternative is to codeposit the second phase metal oxide with the stabilized zirconia. Though not essential to the invention a layer of tetragonal zirconia stabilized with 7% yttria may be deposited both under and over the ceramic coat.

An improved electron beam-physical vapor deposition process is also disclosed. This method includes the step of mounting in a chamber a component(s) to be coated, an ingot of cubic zirconia and an ingot of $Ta_2O_5$. The two ingots being angularly spaced apart and preferably separated by a baffle. The ends of each of the ingots are bombarded with a stream of electrons to form vapors of each. The component is then alternatingly exposed to vapor deposition from the two vapor streams by rotation of the surfaces to be coated.

DESCRIPTION OF THE PREFERRED EMBODIMENT

Figure 1:
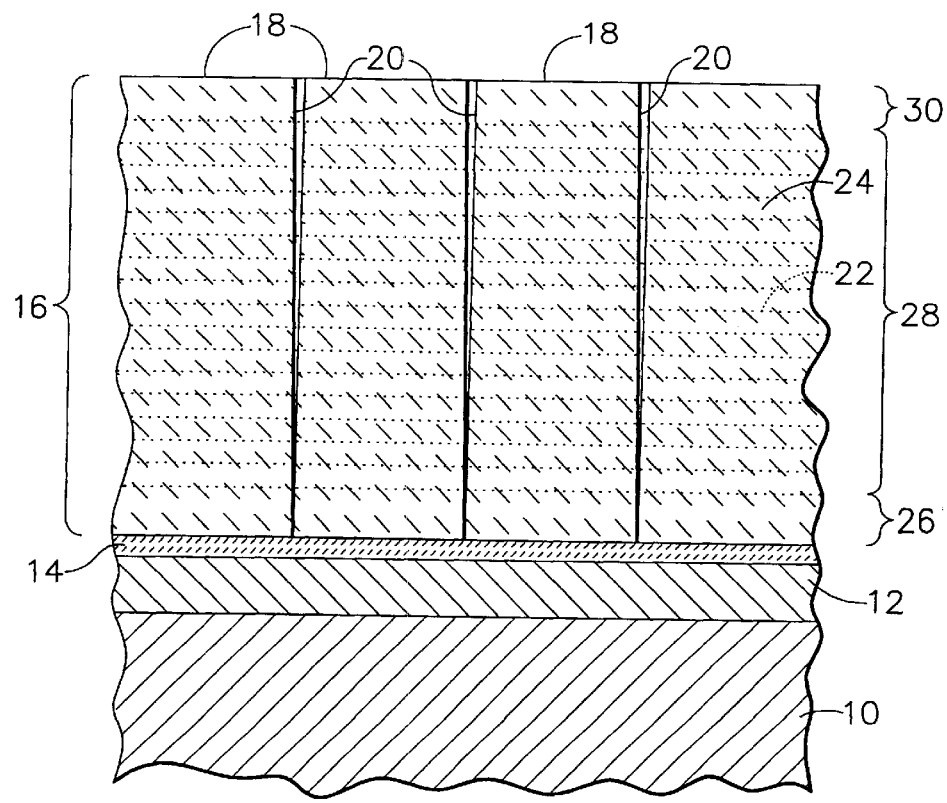
FIG. 1 is a cross sectional schematic of a coated article having a thermal barrier coating as contemplated by the present invention.

Referring to FIG. 1, a base metal or substrate 10 is a nickel, cobalt or iron based high temperature alloy from which turbine airfoils are commonly made. Preferably, the substrate 10 is a superalloy having hafnium and/or zirconium such as MAR-M247 and MAR-M 509, the compositions of which are shown in Table 1.

TABLE 1

| Alloy | Mo | W | Ta | Al | Ti | Cr | Co |
|---|---|---|---|---|---|---|---|
| Mar-M247 | .65 | 10 | 3.3 | 5.5 | 1.05 | 8.4 | 10 |
| Mar-M509 | — | 7.0 | 3.5 | — | 0.25 | 23.4 | Bal. |

| Alloy | Hf | V | Zr | C | B | Ni |
|---|---|---|---|---|---|---|
| Mar-M247 | 1.4 | — | .055 | 0.15 | .15 | bal. |
| Mar-M509 | — | — | .5 | .6 | — | 10.0 |

A bond coat 12 lies over the substrate 10. The bond coat 12 is usually comprised of a MCrAlY alloy. Such alloys have a broad composition of 10 to 35% chromium, 5 to 15% aluminum, 0.01 to 1% yttrium, or hafnium, or lanthanum, with M being the balance. M is selected from a group consisting of cobalt, nickel, and mixtures thereof. Minor amounts of other elements such as Ta or Si may also be present. The MCrAlY bond coat is preferably applied by EB-PVD, through sputtering, low pressure plasma or high velocity oxy fuel spraying or entrapment plating may also be used.

Alternatively, the bond coat 12 can be comprised of an intermetallic aluminide such as nickel aluminide or platinum aluminide. The aluminide bond coat can be applied by standard commercially available aluminide processes whereby aluminum is reacted at the substrate surface to form an aluminum intermetallic compound which provides a reservoir for the growth of an alumina scale oxidation resistant layer. Thus the aluminide coating is predominately composed of aluminum intermetallic [e.g., NiAl, CoAl and (Ni, Co) Al phases] formed by reacting aluminum vapor species, aluminum rich alloy powder or surface layer with the substrate elements in the outer layer of the superalloy component. This layer is typically well bonded to the substrate. Aluminizing may be accomplished by one of several conventional prior art techniques, such as, the pack cementation process, spraying, chemical vapor deposition, electrophoresis, sputtering, and appropriate diffusion heat treatments. Other beneficial elements can also be incorporated into diffusion aluminide coatings by a variety of processes. Beneficial elements include Pt, Pd, Si, Hf, Y and oxide particles, such as alumina, yttria, hafnia, for enhancement of alumina scale adhesion, Cr and Mn for hot corrosion resistance, Rh, Ta and Cb for diffusional stability and/or oxidation resistance and Ni, Co for increasing ductility or incipient melting limits.

In the specific case of platinum modified diffusion aluminide coating layers, the coating phases adjacent to the alumina scale will be platinum aluminide and/or nickel-platinum aluminide phases (on a Ni-base superalloy).

Through oxidation an alumina (i.e., aluminum oxide) layer 14 is formed over the bond coat 12. This alumina layer 14 provides both oxidation resistance and a bonding surface for a ceramic coat 16. The alumina layer may be formed before the ceramic coat 16 is applied, during application of coat 16, or subsequently by heating the coated article in an oxygen containing atmosphere at a temperature consistent with the temperature capability of the superalloy, or by exposure to the turbine environment. The sub-micron thick alumina scale will thicken on the aluminide surface by heating the material to normal turbine exposure conditions. The thickness of the alumina scale is preferably sub-micron (up to about one micron). The alumina layer 14 may also be deposited by chemical vapor deposition or by EB-PVD following deposition of the bond coat 12.

Alternatively, the bond coat 12 may be eliminated if the substrate 10 is capable of forming a highly adherent alumina scale or layer 14. Examples of such substrates are very low sulfur (<1 ppm) single crystal superalloys, such as PWA 1487 and Rene N5, which also contain 0.1% yttrium to enhance adhesion of the thermally grown alumina scale.

The ceramic coat 16 may be any of the conventional ceramic compositions used for this purpose. A preferred composition is yttria stabilized zirconia. Alternatively, the zirconia may be stabilized with CaO, MgO, $CeO_2$ as well as $Y_2O_3$. Another ceramic believed to be useful as the columnar type coating material within the scope of the present invention is hafnia, which can be yttria-stabilized. The particular ceramic material selected should be stable in the high temperature environment of a gas turbine. The thickness of the ceramic layer may vary from 1 to 1000 microns but is typically in the 50 to 300 microns range.

The ceramic coat 16 is applied by EB-PVD and as result has a columnar grained microstructure. The columnar grains or columns 18 are oriented substantially perpendicular to the surface of the substrate 10 and extend outward from the bond coat 12. Between the individual columns 18 are micron sized intercolumnar gaps 20 that extend from the outer surface of the ceramic coat 16 to the alumina layer 14. It should be appreciated that the gaps are only illustrated in FIG. 1. The actual gaps are not necessarily bounded by straight walls as shown and need not have a constant width. In fact the gaps tend to be wider at the outer surface and narrower as the gap extends toward the alumina layer.

In a portion 26 of the grains 18 adjacent the alumina layer 14, the percentage of yttria is on the order of 6 to 8 percent with 7 percent the most preferred. The portion 26 is preferably only a few microns in thickness.

Overlying the portion 26 is a second portion 28 preferably stabilized with a percentage of yttria in the range of 6 to 25 percent. More preferably, the range is 18 to 22 percent with 20 percent the most preferred. As this portion 28 is formed by a multi-evaporation source EB-PVD process, which is described in greater detail below, nanometer size particles of second phase metal oxides such as $Ta_2O_5$ or alumina are deposited within the columnar zirconia grains, preferably on the interfaces 22 between the sub-micron thickness layers 24 of zirconia that are deposited each time that the component is rotated. The range of $Ta_2O_5$ or alumina within the columnar zirconia grains is 0.5 to 15 weight percent, with a range of 1 to 4 percent preferred. The layers 24 in this portion 28 have a thickness in the range of 50 to 500 nanometers with a thickness range of 100 to 200 nanometers preferred. Second phase metal oxides are oxides that do not undergo irreversible changes in composition during processing.

Overlying the portion 28 is an outer portion 30 that like portion 26 contains between 6 to 8 percent yttria with 7 percent preferred. This portion 30 is optional and increases the erosion resistance of the coating. However, neither portions 26 or 30 are essential to the practice of the present invention.

Figure 2:
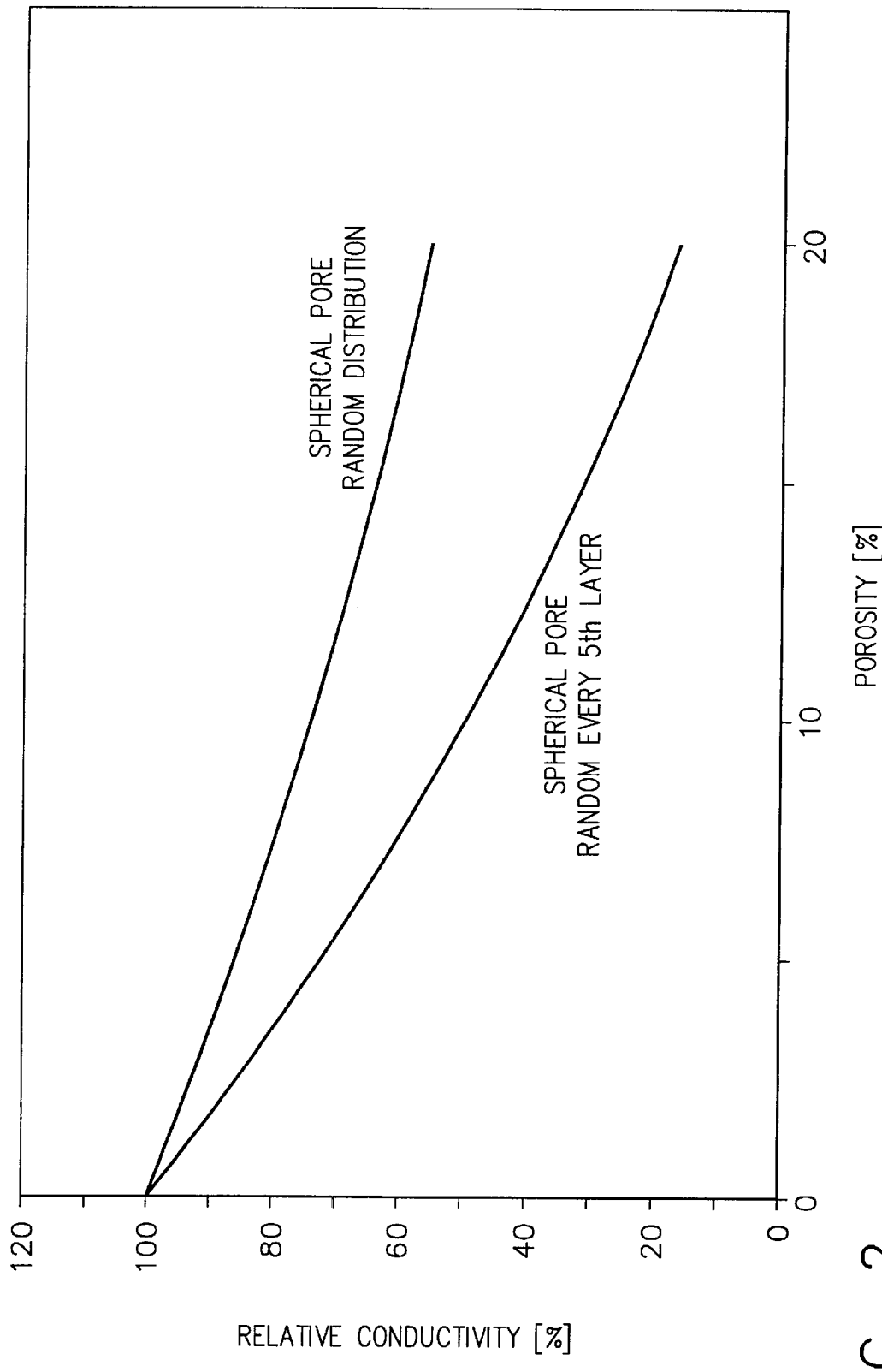
FIG. 2 shows the effect of percent porosity on the thermal conductivity of 7% yttria stabilized zirconia and the advantage of depositing the stabilized porosity in layers.

Though the Applicants do not wish to be held to a particular theory, it is believed that the second phase metal oxide nano particles essentially form stabilized porosity. The difference in thermal expansion between the metal oxide particles ($Ta_2O_5$) and the ceramic (zirconia) results in a void being formed around the oxide, any sintering or chemical bonding between the zirconia and metal oxide, that occurs when the part is at temperature, is broken during subsequent cooling and reheating. While normal porosity in the zirconia would disappear as the pores sinter at the operating temperature, the presence of metal oxides stabilizes the porosity. Heat flowing through the zirconia sees the metal oxide particle as a pore. The effectiveness of second phase particle stabilized nano pores in reducing the thermal conductivity of the zirconia was confirmed by finite element heat flow calculations. The thermal conductivity of an idealized columnar grain of zirconia as shown in FIG. 1 was calculated assuming different distribution, sizes and shapes of the pores. FIG. 2 compares a random distribution of spherical pores with pores randomly distributed in every fifth layer of zirconia. The pore size was 0.01 $\mu$m. The EB-PVD deposition of zirconia is in layers with every layer corresponding to one rotation of the part to be coated. The calculations also showed that for both random distributions and layered distribution the pores were more effective if they were penny shaped rather than spherical. The most effective combination being penny shaped pores randomly distributed in layers. This of course is most easily and effectively obtained by the second phase oxides being deposited between the layers of zirconia. The calculations also showed that the pore size was not critical, but preferably should be around 0.1 μm. The pore size, shape and distribution may be controlled via the evaporation and deposition conditions. For instance, increasing rotation speed will decrease layer thickness and size of the stabilized pores.

Figure 3:
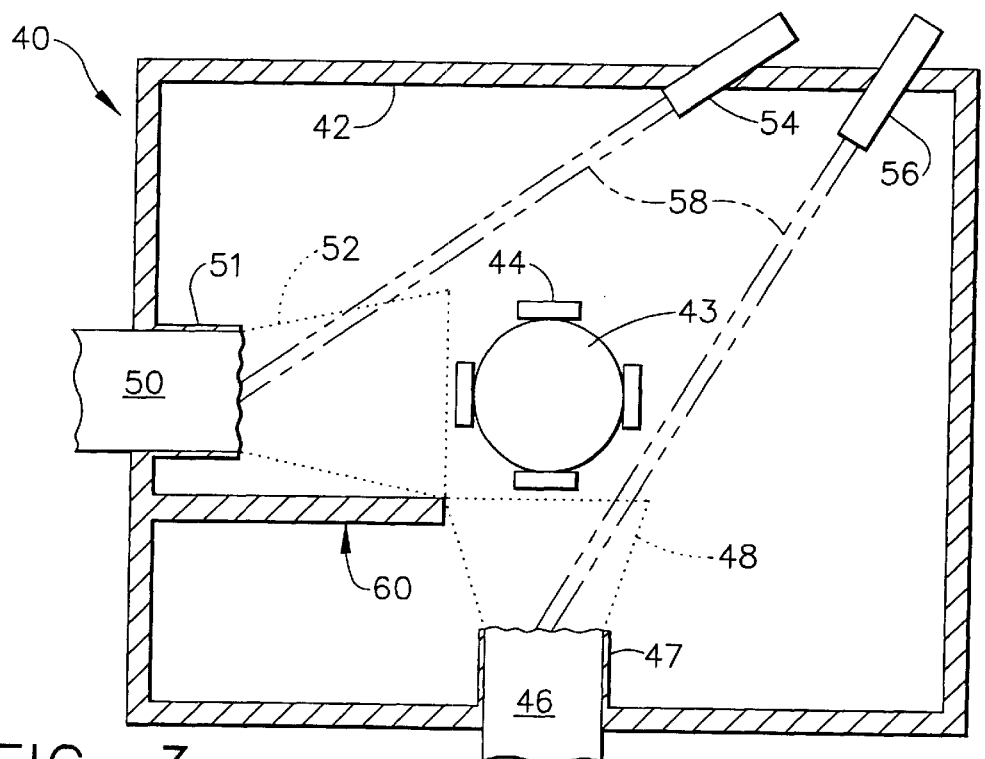
FIG. 3 is a schematic illustration of an apparatus suitable for carrying out a method for forming the thermal barrier coating of FIG. 1.

Referring to FIG. 3, an electron beam physical vapor deposition (EB-PVD) apparatus 40 generally includes a vacuum chamber 42 surrounding a component 44 mounted on a rotatable component holder 43. Two target ingots 46 and 50 are mounted in holders 47 and 51 respectively within the chamber 42. Ingot 46 is preferably zirconia and ingot 50 is preferably $Ta_2O_5$ or alternatively $Al_2O_3$. The ingots 46 and 50 are preferably between 45 to 180 degrees apart with 90 degrees preferred. A baffle 60 may be disposed between the ingots to prevent the evaporation spray or vapor 48 from one to interfere with the evaporation spray or vapor 52 of the other. Two electron beam guns 54,56 are employed with one directed to the ingot 46 and the other to the ingot 50. In use the chamber 42 is evacuated by pumps (not shown). As the mounted components are rotated, the guns 54, 56 supply a stream 58 of high energy electrons to the surface of the ingots respectively. The ingots evaporate causing zirconia vapors and $Ta_2O_5$ vapors that subsequently condense onto the rotating component. Thus, as the component rotates first a layer of zirconia is deposited than a layer of $Ta_2O_5$ is deposited, then another layer of zirconia, etc. This process continues until a preselected thickness of the ceramic coat on the component is obtained. To insure that the deposited vapors are fully oxidized and oxygen rich gas is usually supplied into the chamber 42 through a tube not shown. Because the percent of second phase oxide addition to the zirconia is small it is possible to use ingots of the pure metal, rather than the oxide and allow the oxide to form in the vapor cloud. This preferably requires a small increase in oxygen flow rates above that used to ensure that the zirconia is fully oxidized.

Various modifications and alterations to the above-described preferred embodiment will be apparent to those skilled in the art. Accordingly, this description of the invention should be considered exemplary and not as limiting the scope and spirit of the invention as set forth in the following claims.

What is claimed is:

1. A superalloy article having a ceramic thermal barrier coating on at least a portion of its surface, comprising:
    a superalloy substrate;
    a bond coat overlying the substrate and selected from the group consisting of aluminides and MCrAlY where M is a metal selected from the group consisting of cobalt, nickel, and mixtures thereof; and
    a columnar grained ceramic coat over said bond coat, said ceramic coat having a first portion formed of a matrix of stabilized zirconia having a dispersion of nanometer sized second phase oxide particles.

2. The article of claim 1 wherein said second phase oxide is selected from a group consisting of $Ta_2O_5$ and alumina.

3. The article of claim 1 wherein the zirconia is stabilized with 6 to 25 weight percent of yttria.

4. The article of claim 1 wherein the zirconia is stabilized with 18 to 22 percent yttria.

5. The article of claim 1 wherein the particles are concentrated at deposition interfaces within the columnar grains of said ceramic coat.

6. The article of claim 1 wherein the concentration of second phase oxides within the stabilized zirconia is in the range of 0.5 to 15 percent by weight.

7. The article of claim 1 wherein the concentration range of second phase oxides within the stabilized zirconia is in the range of 1 to 4 percent by weight.

8. The article of claim 1 wherein the superalloy article is a turbine blade or vane.

9. The article of claim 1 wherein said ceramic coat further comprises a layer of zirconia stabilized with 6 to 8 percent yttria between said bond coat and said first portion.

10. The article of claim 1 further comprising a second layer of zirconia stabilized with 6 to 8 percent yttria over said first portion.

11. The article of claim 1 further comprising an oxidation resistant layer between said bond coat and said columnar grained ceramic coat.

12. The article of claim 11 wherein said oxidation resistant layer is alumina.

13. The article of claim 11 wherein said oxidation resistant layer is a thermally grown alumina scale.

14. A thermal barrier coating system for a superalloy substrate, comprising:
    a bond coat overlying the substrate and selected from the group consisting of aluminides and MCrAlY where M is a metal selected from the group consisting of cobalt, nickel, and mixtures thereof; and
    a columnar grained ceramic coat over said bond coat, said ceramic coat having a first portion formed of a matrix of stabilized zirconia which is filled with a dispersion of nanometer sized second phase oxide particles.

15. The thermal barrier coating system of claim 14 wherein said stable oxide is selected from the group consisting of $Ta_2O_5$ and alumina.

16. The thermal barrier coating system of claim 14 wherein the zirconia is stabilized with 6 to 25 weight percent of yttria.

17. The thermal barrier coating system of claim 14 wherein the zirconia is stabilized with 18 to 22% yttria.

18. The thermal barrier coating system of claim 14 wherein the particles are concentrated at deposition interfaces within the columnar grains of said ceramic coat.

19. The thermal barrier coating system of claim 14 wherein the concentration of second phase oxides within the stabilized zirconia is in the range of 0.5 to 15 percent by weight.

20. The thermal barrier coating system of claim 14 wherein the concentration of second phase oxides within the stabilized zirconia is in the range of 1 to 4 percent by weight.

21. The thermal barrier coating system of claim 14 wherein said ceramic coat further comprises a layer of zirconia stabilized with 6 to 8 percent yttria between said bond coat and said first portion.

22. The thermal barrier coating system of claim 21 further comprising a second layer of zirconia stabilized with 6 to 8 percent yttria over said first portion.

23. The thermal barrier coating system of claim 14 further comprising an oxidation resistant layer between said bond coat and said columnar grained ceramic coat.

24. The thermal barrier coating system of claim 23 wherein said oxidation resistant layer is alumina.

25. The thermal barrier coating system of claim 24 wherein said oxidation resistant layer is a thermally grown alumina scale.

26. A superalloy article comprising a turbine blade or vane having a ceramic thermal barrier coating on at least a portion of its surface, comprising:

a superalloy substrate;

a bond coat overlying the substrate and selected from the group consisting of aluminides and MCrAlY where M is a metal selected from the group consisting of cobalt, nickel, and mixtures thereof;

a columnar grained ceramic coat over said bond coat, said ceramic coat having a first portion formed of a matrix of stabilized zirconia having a dispersion of nanometer sized second phase oxide particles;

a layer of zirconia stabilized with 6 to 8 percent yttria between said bond coat and said first portion; and a second layer of zirconia stabilized with 6 to 8 percent yttria over said first portion.

* * * * *